United States Patent [19]

Ivarsson et al.

[11] Patent Number: 4,617,280

[45] Date of Patent: Oct. 14, 1986

[54] REFRACTORY LINING AND PROCESS FOR ITS MANUFACTURE

[75] Inventors: Paul L. Ivarsson, Höganäs; Ingvar G. A. Blom, Nyhamnsläge; Lars G. Berg, Höganäs, all of Sweden

[73] Assignee: Höganäs AB, Höganäs, Sweden

[21] Appl. No.: 659,002

[22] Filed: Oct. 9, 1984

[51] Int. Cl.$^4$ ............................................. C04B 38/02
[52] U.S. Cl. ........................................ 501/84; 501/80; 501/112; 501/122; 106/75
[58] Field of Search ................ 501/84, 80, 112, 122; 106/84, 75

[56] References Cited

U.S. PATENT DOCUMENTS

| | | | |
|---|---|---|---|
| 2,921,357 | 11/1955 | Fujii et al. | 106/84 |
| 3,257,217 | 6/1966 | Van Dreser et al. | 501/122 |
| 3,758,316 | 11/1973 | Sowards | 106/84 |

*Primary Examiner*—William R. Dixon, Jr.
*Assistant Examiner*—Karl Group
*Attorney, Agent, or Firm*—Burns, Doane, Swecker & Mathis

[57] ABSTRACT

Refractory lining for e.g. casting boxes comprising a refractory matrix and precipitated silica, the silica being precipitated in situ to form a structure, imparting to the material a volume weight of from about 0.8 to about 1.2 g/cm$^3$, the material being substantially free from carbon, hydrogen and available oxygen; process for the manufacture of such refractory lining.

9 Claims, No Drawings

REFRACTORY LINING AND PROCESS FOR ITS MANUFACTURE

The present invention relates to refractory linings intended for example for casting boxes for continuous casting of steel. The invention also covers a process for the manufacture of such refractory linings.

In metallurgic industry the problem frequently arises in casting of metals to design the lining in the equipment used in such a manner that it meets the requirements as to strength, maintenance etc. In for example continuous casting of steel the molten steel is discharged from a steel ladel into so-called casting boxes which in the bottom thereof are provided with a number of nozzles having for a function to divide the steel into strings which solidfy and are then cut into suitable lengths.

Such casting box is lined with bricks which are protected by ceramic tiles. The thickness of these tiles is about 2-3 cm and normally the tiles are replaced after each casting cycle. Two subsequent casting operations may possibly be carried out without intermediate replacement of the tiles. After the casting the casting box is allowed to cool and is then turned upside down so that the lining can fall out thereof, new tiles being then introduced into the casting box.

The refractory lining must resist the thermal and chemical attacks and must, moreover, be porous to provide for heat insulation. Spot-wise destruction to the lining results in attacks on the under-lined brick material, the application of which involves high costs, the underlying bricksurface being, moreover, uneven. The porosity of the lining has for a purpose to maintain the steel temperature as constant as possible so as to result in good casting characteristics.

It is essential that the refractory lining does not contain substances releasing oxygen, hydrogen or carbon. The presence of such substances can result in the generation of gases from the lining causing turbulant movements in the steel bath which may have adverse effect on the casting operation. Moreover, release of the elements just mentioned may result in reaction with the molten metal so as to negatively affect the properties of the product.

Refractory linings for the above purposes are presently available on the market in the form of slabs. Such known slabs are based on a combination of olivine and magnesite. To provide for the desired porosity there is often used newspaper waste and some form of ceramic wool, basalt wool. In the known products plastics of the type carbamoid resins are often used as a binder. At the high increase of the temperature arising in the practical use of the lining the materials contained in the lining material may release carbon and a ceramic wool releases when decomposed oxygen, the steel melt being negatively affected. The present invention has for its purpose to provide a refractory lining useful in for example casting boxes wherein the drawbacks of the prior art as discussed above are avoided or at least substantially reduced. The invention also provides for a process for the manufacture of this new refractory lining.

While in the present disclosure the present invention will be described in the following mainly with reference to casting boxes for the casting of steel it should be noted that the invention is not limited to only this use. The invention is applicable in all cases where a protective refractory lining is used to protect a material positioned behind the lining which material must not be damaged in connection with handling of the metal melts.

To obtain the significant advantages and to eliminate the drawbacks associated with the prior art there is provided by the present invention a refractory lining comprising a refractory matrix and precipitated silica. In accordance with the invention the silica is precipitated in situ to form a structure imparting to the material a volume weight of from about 0.8 to about 1.2 $g/cm^3$. The refractory lining is, moreover, substantially free from carbon, hydrogen and available oxygen.

The refractory material or matrix present in the lining according to the invention comprises conventional refractory grains as a filler, so-called grogg. This refractory matrix is selected from conventional refractory materials, such as magnesite or olivine or mixtures thereof. The composition of the refractory material can vary from pure magnesite to pure olivine. As is known magnesite is constituted by magnesium oxide (MgO), whereas olivine is a mixed silicate ($2MgO \times 2FeO \times 2SiO_2$).

As previously mentioned the invention also provides for a process for the manufacture of such refractory lining. In this process a silica-generating material, i.e. a material which is a source of silica, is foamed in an aqueous environment to form a fine-blistered foam. Into this foam there is then admixed a refractory matrix-forming material and a precipitating agent having the ability to provide for precipitation of silica. The silica is then allowed or brought to precipitate to form in view of the foam structure a framework imparting strength and desired porosity to the material.

The desired precipitation of the silica to provide for strength and porosity takes place in the presence of a precipitating agent spontaneously already at room temperature, but it is preferred to accelerate the precipitation by carrying out same at somewhat increased temperature, for example of the order of 40°-50° C.

The source of silica for use in the process according to the invention is not critical as to its character as long as it supplies silica which can be precipitated for obtaining the desired result. Preferred silica-generating materials are selected among sodium and potassium waterglass and colloidal silica. Sodium waterglass is a particularly preferred source of silica.

As a precipitating agent to facilitate the precipitation of the silica any conventional precipitating agent may be used. Among such precipitating agents there may be mentioned sodium hexafluorosilicate ($Na_2SiF_6$), lead oxide, organic esters, calcium hydroxide, magnesium hydroxide and others. It is particularly preferred to use sodium hexafluorosilicate or some organic precipitating agent.

For the foaming there is used a conventional foaming agent, the character of which is not critical as long as the sufficient foaming effect will be obtained. The foaming agent is suitably a surfactant, preferably an anionic surfactant, such as sulphated or sulphonated substances. Among suitable foaming agents there may be mentioned unbranched alkyl sulphates or sulphonates, possibly with small quantities of additives, such as long-chained and saturated fatty acids and primary alcoholes. To obtain a high surface viscosity of the foam it is suitable that at least two types of components are present in the foaming agent. Thus, long unbranched hydrocarbon chains and small terminal polar groups particularly suitable for obtaining high surface viscosity. The foaming agent may contain both soluble anionic surfactants and small quantities of non-ionic components, which may be relatively insoluble in water. Solutions of fatty acid soaps are examples of multicomponent systems resulting in useful foams.

The technique of the present invention can be applied in two principally different ways. According to one aspect of the invention the refractory lining can be manufactured in situ, i.e. within the appropriate container, ladle or casting box, wherein it is intended to be used. According to another aspect of the invention the refractory lining can be manufactured in the form of pre-fabricated elements. In the latter case the mixture of materials is transferred to a mould before the precipitation of the silica, solidifaction taking place in the mould.

The technique of the invention will in the following be further described and then finally in the form of specific examples.

A foam is generated by beating in a container starting from a foaming agent and a suitable quantity of water, the desired quantity of silica-generating material, for example sodium waterglass, being added. The beating is continued to the formation of a fine-blistered foam. The ready-mixed refractory matrix material, for example a mixture of olivine and magnesite, is then added under stirring. This material has a suitable grainsize, for example less than about 1-2 mm. Finally, there is added a suitable quantity of precipitating agent for silica, and when preparing pre-fabricated elements the homogeneous mass obtained is poured into a mould which is vibrated and excess material is removed.

The filled mould is then heated to an increased temperature for example about 40°-50° C. and the atmospheric humidity is adjusted to a suitable value. When the silica has precipitated in the material the pre-fabricated element has obtained the necessary mechanical strength so that it can be heated to a higher temperature, suitably exceeding 100° C., so as to expel all water from the element. The element does then not contain any mechanically bound water and has a good and sufficient mechanical strength to stand the stress subjected to it in transportation and use.

Depending on the quantity of added foam the volume weight of the element can be varied as desired. While hitherto for available elements usually have a volume weight of about 1.3-1.7 g/cm$^3$ it is possible using the technique of this invention to manufacture elements or linings having a volume weight down to about 0.8 g/cm$^3$ maintaining sufficient strength. A particularly preferred range is about 0.8- about 1.2 g/cm$^3$ and especially about 0.8 to about 1.0 g/cm$^3$. The lower volume weight results in significant advantages in the manual handling of the pre-fabricated elements, for example in transportation and when assembled on the site.

The refractory lining provided by the present invention has a low loss due to burning, less than 2%, and results in quite an even flow pattern in for example a casting box lined therewith. Moreover, there is no risk of carbonization of the molten metal and the risk for oxygen uptake is more or less completely eliminated. In addition, the lining according to the invention contains no hydrogen which is a further advantage.

In order that the refractory lining shall obtain the necessary mechanical strength to enable handling and transportation and to withstand the stresses during use it is preferred to add the silica-generating material in such an amount as to give a content of silica in the final product of about 5-10% by weight. A particularly preferred range with regard to the content of silica in the product of the invention is about 7-8% by weight.

Earlier in this disclosure there has been described a preferred embodiment of the process of the invention for the manufacture of the refractory lining. It will be obvious to the skilled artisan that the foaming of the material can take place starting from a mixture of silica-generating material and matrix-forming material, the precipitating agent being added simultaneously with or subsequently to the foaming to provide for precipitation of the silica to form the desired framework.

The invention will in the following be described further by non-limiting examples.

EXAMPLE 1

Pre-fabricated slabs.

Material composition: olivine plus magnesite (60% olivine less than 1 mm, 40% MgO, 60% less than 230 mesh) 80 parts by weight.

Sodium waterglass 36°-38° Bé ratio 1:3.35 20 parts by weight

Precipitating agent ($Na_2SiF_6$) 1 parts by weight

Foam +3.3% $H_2O$ 0.13 parts by weight

Water for dissolving precipitating agent 2 parts by weight

The foaming agent (for example metheor foam) and part of the water are foamed using a propeller stirrer. After about 1 minute the waterglass is added and a homogeneous slurry is obtained. This slurry is poured into a bakery mixer and the refractory material consisting of magnesite and olivine is added. Finally, the precipitating agent is added and if necessary more water to suitable consistency. The slurry obtained is put into a simple iron mould and is leveled therein.

The precipitation of $SiO_2$ can take place spontaneously at room temperature which takes a few hours. At about 50° C. the silica precipitates within about 1 hour. Irrespective of the temperature at which the silica is precipitated the foam maintains its volume until binding has occurred.

The pre-fabricated elements obtained have the dimensions 800×400×25 mm and show good strength. The volume weight is about 1.2.

EXAMPLE 2

Example 1 is repeated but using $K_2SiF_6$ as a precipitating agent. Pre-fabricated elements of about the same favourable properties are obtained.

EXAMPLE 3

Example 1 is repeated but using a larger quantity of foam so as to obtain slabs having a volume weight of about 1 g/cm$^3$. The slabs have satisfactory strength and in part in view of their lower porosity quite good insulating effect.

EXAMPLE 4

Example 1 is repeated but using colloidal silica (Ludox) in an amount equivalent to that of the sodium waterglass of Example 1. Slabs of similar properties are obtained.

To summarize there is obtained by using the technique of this invention the following significant advantages as compared to the conventional art.

(a) The refractory lining according to the invention has no negative influence of the metal melt due to its lack of carbon, hydrogen and available oxygen.

(b) In view of the low volume weight there are obtained advantages in handling but also a better insulating effect.

(c) The technique according to this invention results in view of its simplicity in substantial practical and economical advantages.

We claim:

1. A process for the manufacture of a refractory lining comprising foaming a silica-supplying material and a refractory matrix-forming material selected from magnesite and olivine in an aqueous environment to form a fine-blistered foam, and admixing in the resulting mixture a precipitating agent having the ability to provide for precipitation of silica, the silica being then precipitated to form a structure imparting strength and porosity to the material and imparting a volume weight to the material of from about 0.8 to about 1.2 g/cm$^3$.

2. A process according to claim 1, wherein the precipitation of the silica is provided by heating to an increased temperature, suitably about 40°–50° C.

3. A process according to claim 2, wherein the silica-supplying material is selected from sodium or potassium waterglass and colodial silica.

4. A process according to claim 1, wherein the silica-supplying material is selected from sodium or potassium waterglass and coloidal silica.

5. A process according to claim 1 wherein the precipitating agent is sodium hexafluorosilicate ($Na_2SiF_6$).

6. A process according to claim 1, further comprising manufacturing the refractory lining on the site where it is intended to be used.

7. A process according to claim 1, further comprising manufacturing the refractory lining in the form of prefabricated elements by transferring the mixture of materials before precipitating the silica to a mould wherein solidification is allowed to take place.

8. A process for the manufacture of a refractory lining comprising the steps of:
   (i) foaming a silica-supplying material and a refractory matrix-forming material in an aqueous environment to form a fine-blistered foam, the foaming being carried out to such an extent so as to impart to said liner a volume weight of from about 0.8 to about 1.2 g/cm$^3$;
   (ii) admixing into said fine blistered foam a precipitating agent having the ability to provide for precipitation of silica, the silica being then precipitated to form a structure imparting strength and porosity to said lining.

9. A process according to claim 8 further comprising adding the silica-supplying material in such an amount as to give a content of silica in said refractory lining of 5%–10% by weight.

* * * * *